(12) United States Patent
Loui et al.

(10) Patent No.: US 10,229,340 B2
(45) Date of Patent: Mar. 12, 2019

(54) SYSTEM AND METHOD FOR COARSE-TO-FINE VIDEO OBJECT SEGMENTATION AND RE-COMPOSITION

(71) Applicant: KODAK ALARIS, INC., Rochester, NY (US)

(72) Inventors: Alexander C Loui, Rochester, NY (US); Chi Zhang, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 168 days.

(21) Appl. No.: 15/441,978

(22) Filed: Feb. 24, 2017

(65) Prior Publication Data

US 2017/0243078 A1    Aug. 24, 2017

Related U.S. Application Data

(60) Provisional application No. 62/299,298, filed on Feb. 24, 2016.

(51) Int. Cl.
| | |
|---|---|
| G06K 9/46 | (2006.01) |
| G06K 9/62 | (2006.01) |
| G06T 11/60 | (2006.01) |
| G06T 7/215 | (2017.01) |

(52) U.S. Cl.
CPC ........ *G06K 9/4671* (2013.01); *G06K 9/6218* (2013.01); *G06T 7/215* (2017.01); *G06T 11/60* (2013.01)

(58) Field of Classification Search
None
See application file for complete search history.

(56) References Cited

U.S. PATENT DOCUMENTS

2018/0005039 A1 *    1/2018   Jachalsky ................. G06T 7/33

* cited by examiner

*Primary Examiner* — Idowu O Osifade
(74) *Attorney, Agent, or Firm* — Hogan Lovells US LLP

(57) ABSTRACT

Embodiments of the present disclosure include a computer-implemented method that receives a digital image input, the digital image input containing one or more dynamic salient objects arranged over a background. The method also includes performing a tracking operation, the tracking operation identifying the dynamic salient object over one or more frames of the digital image input as the dynamic salient object moves over the background. The method further includes performing a clustering operation, in parallel with the tracking operation, on the digital image input, the clustering operation identifying boundary conditions of the dynamic salient object. Additionally, the method includes combining a first output from the tracking operation and a second output from the clustering operation to generate a third output. The method further includes performing a segmentation operation on the third output, the segmentation operation extracting the dynamic salient object from the digital image input.

20 Claims, 11 Drawing Sheets

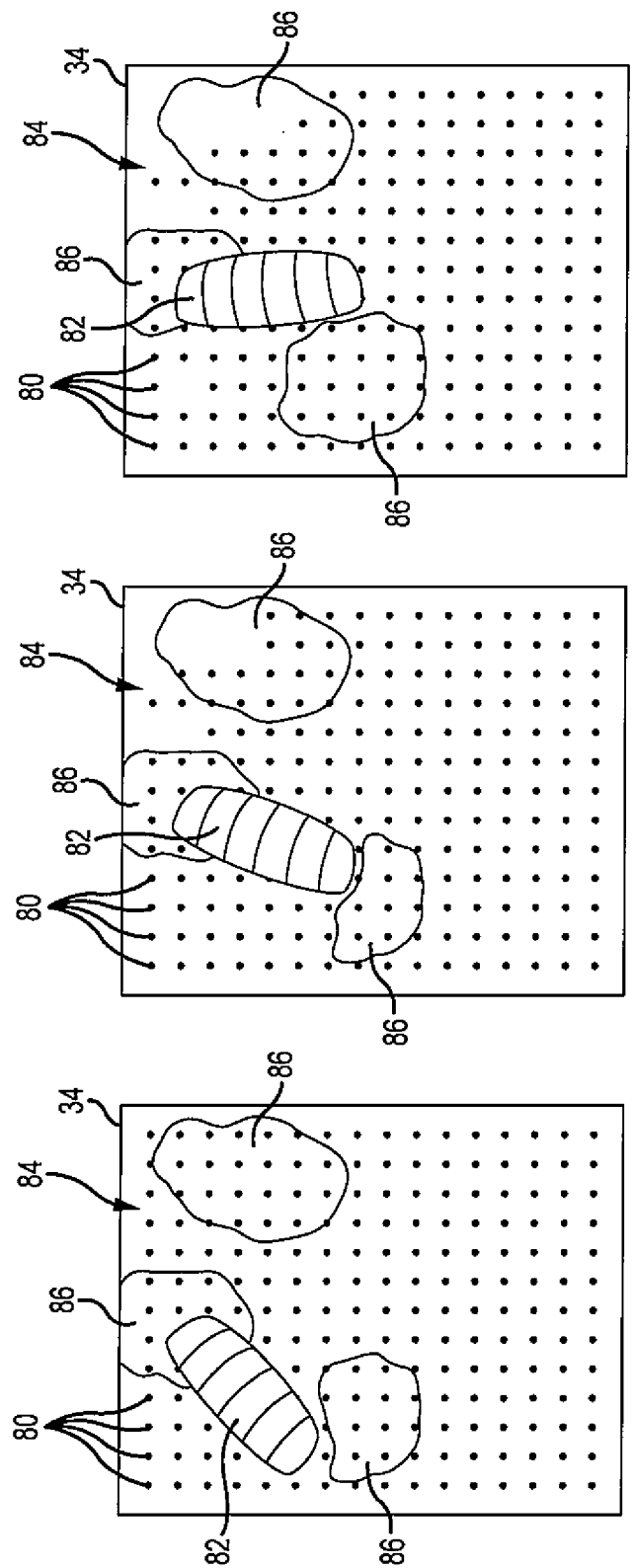

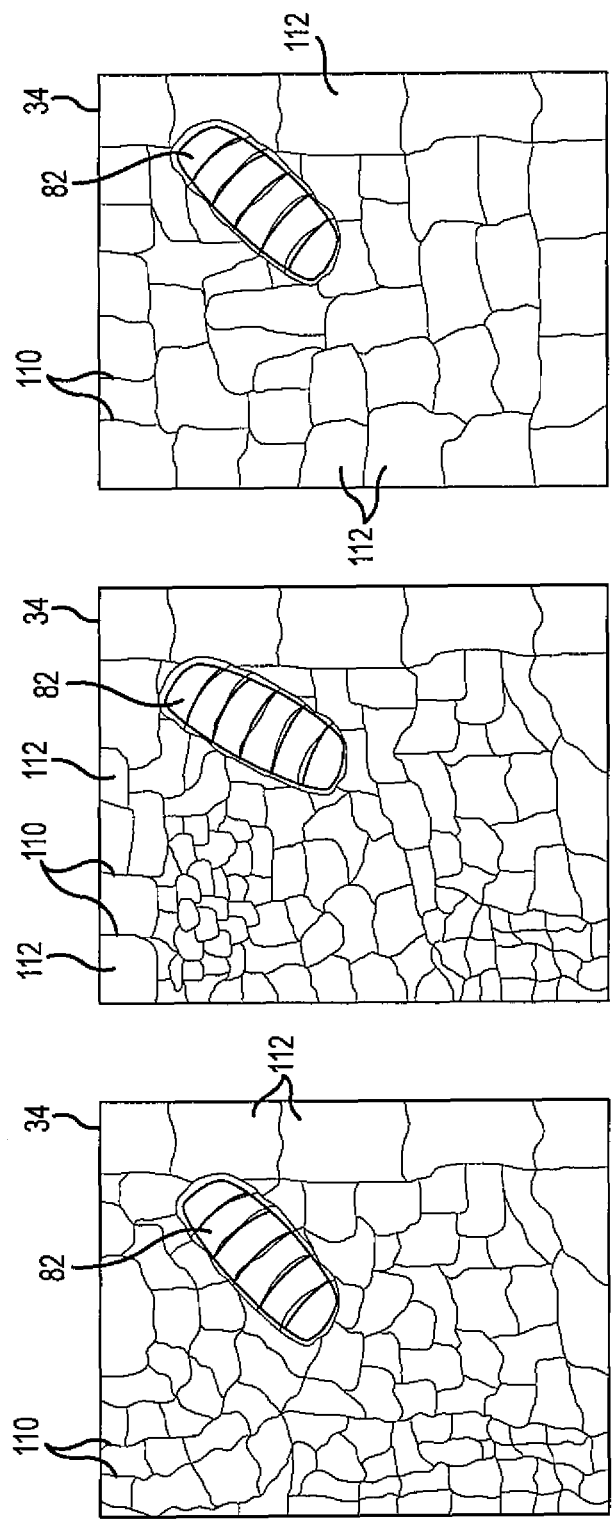

SYSTEM AND METHOD FOR COARSE-TO-FINE VIDEO OBJECT SEGMENTATION AND RE-COMPOSITION

CROSS-REFERENCE TO RELATED APPLICATION

This application claims the benefit of U.S. Provisional Application No. 62/299,298, filed on Feb. 24, 2016 and hereby incorporates by disclosure thereof in its entirety.

BACKGROUND

1. Field of the Invention

The present disclosure relates to digital image analysis. More particularly, the present disclosure relates to systems and methods for digital video analysis and extraction of salient objects.

2. Description of Related Art

Low cost, high quality digital capture devices, such as digital cameras, smart phones, and wearable technologies have increased the opportunities for users to capture and subsequently share, for example, through social media, digital images, such as pictures and videos. The integration of these devices into society has increased not only the quantity of digital images and videos captures, but also associated data, such as metadata and options to share the images and videos. Users, however, may not be pleased with their digital images and videos, or may wish to apply effects to the images to improve the shareability of the images or provide visually pleasing enhancements. Digital image and video editing may be resource intensive for personal electronic devices, such as smart phones, and therefore it may be challenging for users to apply desirable effects to their captured images and videos. It is now recognized that new methods to analyze and edit captured images and videos are desired.

SUMMARY

Applicants recognized the problems noted above herein and conceived and developed systems and methods for analysis and extraction of salient objects, from digital images, such as pictures and videos.

A computer-implemented method is provided that includes receiving a digital image input, the digital image input containing one or more dynamic salient objects arranged over a background. The method also includes performing a tracking operation, the tracking operation identifying the dynamic salient object over one or more frames of the digital image input as the dynamic salient object moves over the background. The method further includes performing a clustering operation, in parallel with the tracking operation, on the digital image input, the clustering operation identifying boundary conditions of the dynamic salient object. Additionally, the method includes combining a first output from the tracking operation and a second output from the clustering operation to generate a third output. The method further includes performing a segmentation operation on the third output, the segmentation operation extracting the dynamic salient object from the digital image input.

The invention also provides a system includes one or more processors and memory including instructions that, when executed by the one or more processors, cause the system to receive a digital image input, the digital image input containing one or more dynamic salient objects arranged over a background. Additionally the instructions cause the system to perform a tracking operation, the tracking operation identifying the dynamic salient object over one or more frames of the digital image input as the dynamic salient object moves over the background. Moreover, the instructions cause the system to perform a clustering operation, in parallel with the tracking operation, on the digital image input, the clustering operation identifying boundary conditions of the dynamic salient object. Additionally, the instructions cause the system to combine a first output from the tracking operation and a second output from the clustering operation to generate a third output. Also, the instructions cause the system to perform a segmentation operation on the third output, the segmentation operation extracting the dynamic salient object from the digital image input.

Also provided is a non-transitory computer-readable storage medium storing instructions that, when executed by one or more processors, cause a computing system to receive a digital image input, the digital image input containing one or more dynamic salient objects arranged over a background. Additionally, the instructions cause the computing system to perform a tracking operation, the tracking operation identifying the dynamic salient object over one or more frames of the digital image input as the dynamic salient object moves over the background. Also, the instructions cause the computing system to perform a clustering operation, in parallel with the tracking operation, on the digital image input, the clustering operation identifying boundary conditions of the dynamic salient object. Furthermore, the instructions cause the computer system to combine a first output from the tracking operation and a second output from the clustering operation to generate a third output. Moreover, the instructions cause the computer system to perform a segmentation operation on the third output, the segmentation operation extracting the dynamic salient object from the digital image input.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIGS. 4A, 4B and 4C are schematic diagrams of an embodiment of an object tracking algorithm, in accordance with embodiments of the present disclosure;

FIGS. 7A, 7B and 7C are schematic diagrams of an embodiment of a voxel grouping algorithm, in accordance with embodiments of the present disclosure;

DETAILED DESCRIPTION

Figure 1:
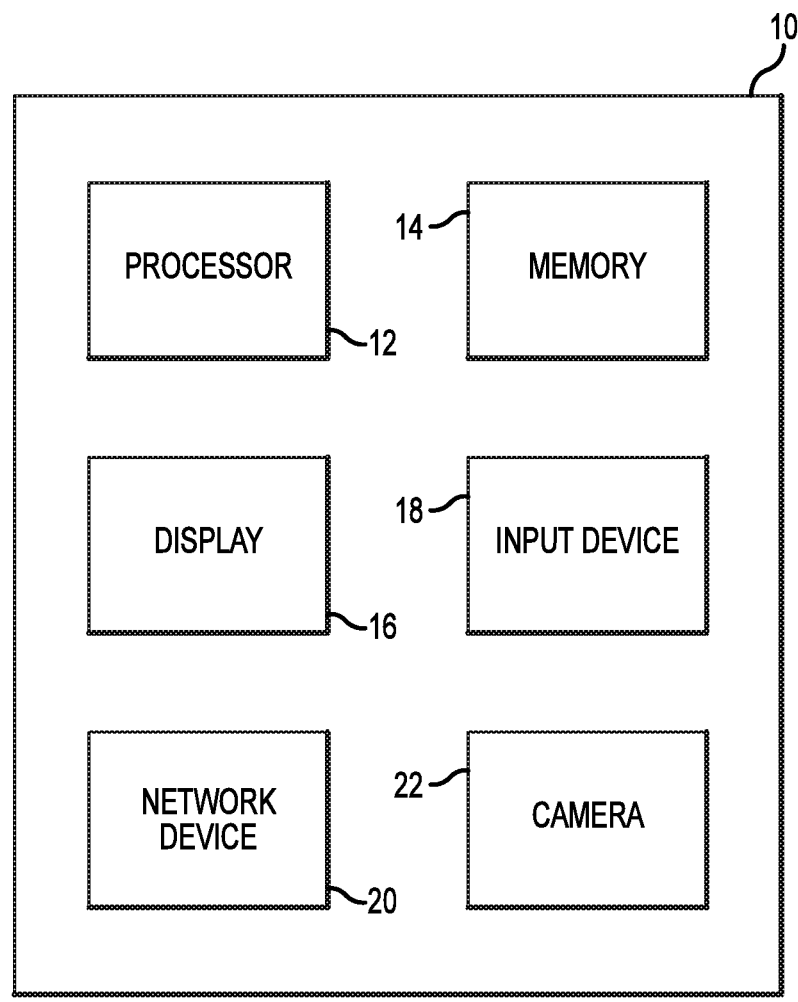
FIG. 1 is a schematic block diagram of an embodiment of a personal electronic device, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present invention include techniques for object level segmentation and detection. Object level video segments may include spatiotemporal units such as moving persons, moving vehicles, flowing river, etc. Different from image segmentation, the segmented video frames maintain both visual and motion coherence. In certain embodiments, video segmentation techniques can be grouped into three categories: spatial first segmentation; temporal first segmentation; and joint spatiotemporal segmentation. The first category may utilize methods used for static image segmentation. The second category may track discrete feature points to extract the trajectories from all frames. Those trajectories belonging to the same objects are further spatially grouped with appearance features. The third category processes all frames together as a spatiotemporal volume in which an object is a three dimensional tube.

Embodiments of the invention include coarse-to-fine framework and prototype system for automatically segmenting a video sequence and extracting a salient moving object from it. Moreover, embodiments of the present invention include generating both static and dynamic effects by re-composing the extract moving objects onto a different image or video sequence. The proposed framework is comprised of point tracking algorithms and motion clustering of pixels into groups. In parallel, a pixel grouping method is used to generate supervoxels for the corresponding frames of the video sequence. Coarse segmentation may be achieved by combining the results of previous steps. Subsequently, a graph-based segmentation technique is used to perform fine segmentation and extraction of the salient object.

Embodiments of the invention include systems and methods of identifying salient objects from digital images (e.g., still images, dynamic images, etc.) and extracting the salient objects for later re-composition. For example, in certain embodiments, the salient objects may be tracked and segmented in parallel to facilitate identification of dynamic salient objects over a number of frames and to facilitate later extraction of the salient objects. Thereafter, further processing may be performed to enable additional segmentation and extraction of the salient object. Upon identification and segmentation, the salient object may be re-compositioned over a different digital image. For example, if the salient object were in a video sequence, the salient object may be extracted and superimposed over a different video sequence, thereby generating a pleasing visual effect. The extraction of salient objects and re-composition of these extracted objects can be used in various computer graphics, augmented reality (AR), or virtual reality (VR) applications.

FIG. 1 is a schematic diagram of an embodiment of a personal electronic device (PED) 10, such as a smart phone, wearable device, computer, or the like. In the illustrated embodiment, the PED includes one or more processors 12, one or more memories 14, a display 16, an input device 18, a network device 20, and a camera 22. For example, the one or more processors 12 may include one or more microprocessors capable of processing machine-readable instructions, such as software, printed on the memory 14. In certain embodiments, the memory 14 is a computer-readable medium (e.g., a machine readable medium, a non-transitory computer-readable storage medium, a propagated-signal medium, and/or a signal-bearing medium) that may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include an electrical connection (e.g., having one or more wires), a portable magnetic or optical disk, a volatile memory such as a Random Access Memory (RAM), a Read-Only Memory (ROM), an Erasable Programmable Read-Only Memory (EPROM or EEPROM), a non-volatile memory such as flash memory (e.g., NAND or NOR-type flash memory) or solid-state drives, or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. As such, the processor 12 may be communicatively coupled to the memory 14 to perform one or more steps stored in machine-readable software.

In the illustrated embodiment, the PED 10 includes the display 16, which may be a visual display, such as a light-emitting diode (LED), organic light-emitting diode (OLED), liquid-crystal display (LCD), color super twisted nematic (CSTN), thin film transistor (TFT), thin film diode (TFD), active-matrix organic light-emitting diode (AMO-LED), or the like. It should be appreciated that any type of display device may be utilized with embodiments of the present disclosure. Moreover, in the embodiment illustrated in FIG. 1, the PED 10 includes the input device 18. In certain embodiments, the input device 18 may be integrated with the display 16. For example, the display 16 may be a capacitive touchscreen or a resistive touchscreen that transmits input from a user to the PED 10. Moreover, the input device 18 may be any number of buttons, switches, or the like that allow a user to interact with the PED 10. In this manner, the user may utilize the PED 10 to input instructions or commands.

As shown in FIG. 1, the PED 10 includes the network device 20 to enable communication between the PED 10 and one or more other devices. For example, the network device 20 may be a communication device, such as a BLUETOOTH transducer, wireless internet (Wi-Fi) transducer, near-field communication transducer, Ethernet connection, cellular radio, or the like. It should be appreciated that the network device 20 may be any device that enables the PED 10 to communicate with another device and further includes hardline inputs, such as a universal serial bus, THUNDERBOLT connector, FIREWIRE connector, high-definition multimedia interface, or the like. As such, the PED 10 may be utilized to send and receive information between other devices, for example, over an Internet connection.

In the illustrated embodiment, the PED 10 also includes the camera 22. The camera 22 is an optical instrument utilized to record or capture images. For example, the camera 22 may be utilized to capture static images (e.g., photographs) or dynamic images (e.g., video). As will be described in detail below, the camera 22 may be utilized to capture one or more images for processing. In certain embodiments, the camera 22 may receive instructions from the processor 12, for example, to enable the camera 22 to zoom in on a certain objects or to automatically focus the camera on an object.

Figure 2:
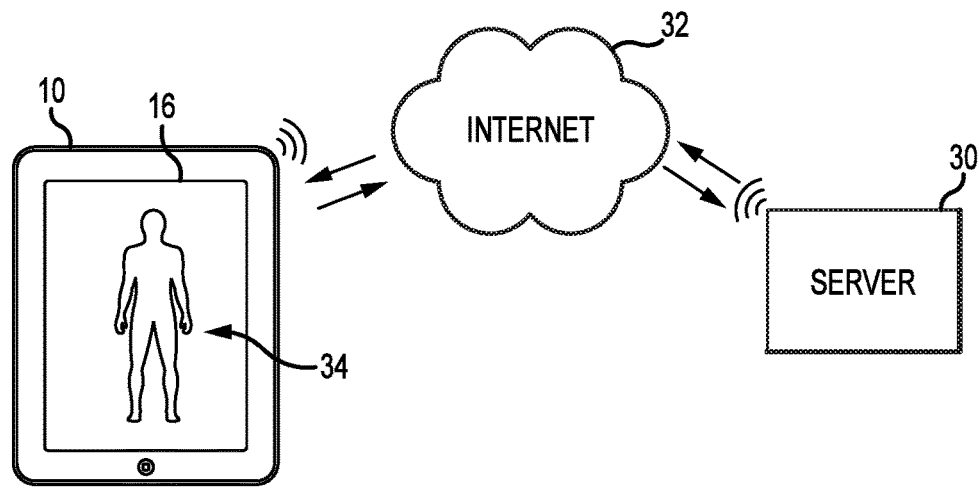
FIG. 2 is a schematic block diagram of an embodiment of the personal electronic device of FIG. 1 in communication with a server, in accordance with embodiments of the present disclosure.

FIG. 2 is a schematic diagram of an embodiment of the PED 10 communicating with a server 30. As illustrated, the PED 10 is positioned to send and receive information from the Internet 32, for example, with the network device 20. In the illustrated embodiment, the PED 10 includes the display 16 containing a digital image 34. In certain embodiments, the digital image 34 may be either static or dynamic. Moreover, the digital image 34 may be received from a number of sources. For example, the camera 22 may be utilized to capture the digital image 34. Additionally, in certain embodiments, the digital image 34 may be downloaded, for example, from the Internet 32, or transmitted to the PED 10 from a second PED, for example, via the network device 20. As illustrated, the Internet 32 is in communication with the server 30 to thereby enable transmission of information between the PED 10 and the server 30. For example, the server 30 may include a cloud-based network that enables the user to store digital images 34 for retrieval by the PED 10. Furthermore, as described below, the server 30 and/or the PED 10 may include additional digital images 34 that enable the user to instruct the software on the PED 10 to superimpose a captured, extracted image onto another static or dynamic digital image 34.

Figure 3:
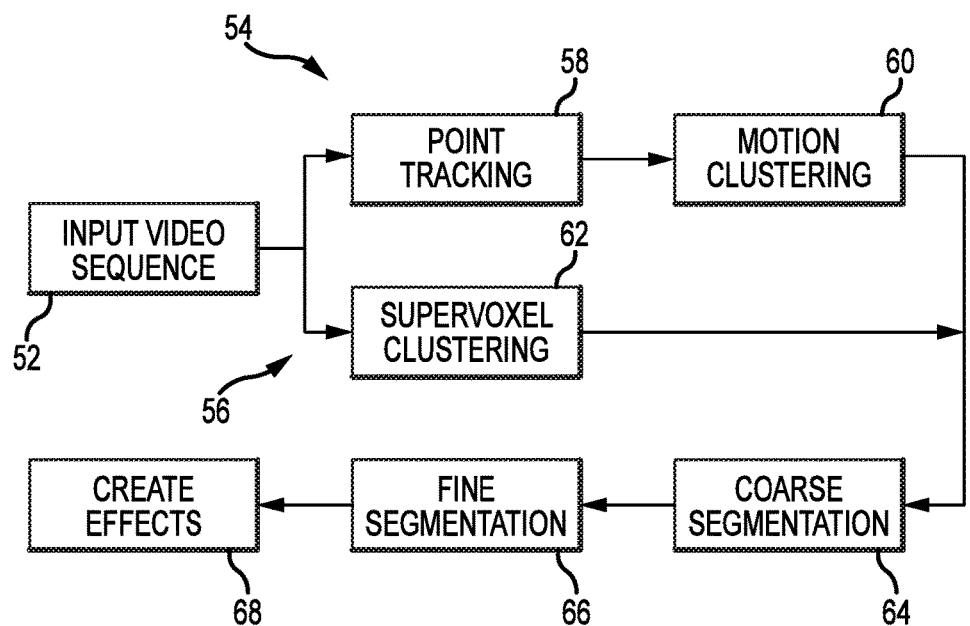
FIG. 3 is a flow chart of an embodiment of a method for salient object segmentation and re-composition, in accordance with embodiments of the present disclosure.

FIG. 3 is a block diagram of an embodiment of a method 50 for tracking, segmentation, and extraction of a salient object from a digital image. As describe above, the digital images may be either static or dynamic, however, the present discussion will focus on dynamic digital images, such as videos. In the illustrated embodiment, a digital image (e.g., a video sequence) is input into the method 50 (block 52). For example, a user-captured video, via the camera 22, may be uploaded into the method 50 for processing. Thereafter, the input video is processed along a first track 54 and a second track 56, in parallel. In the illustrated embodiment, the first track 54 utilizes one or more techniques for object tracking. Moreover, as illustrated in FIG. 3, the second track 56 utilized one or more techniques for object segmentation. As will be described below, performing the processing in parallel improves the speed of processing, and moreover, provides the benefit of utilizing different techniques to process the same digital image, thereby enabling later object extraction and re-composition.

In the illustrated embodiment, the first track 54 includes performing point tracking on the digital image (block 58), for example, with an algorithm. For example, various point tracking techniques, such as particle filter, mean shift tracking, Kanade-Lucas-Tomasi (KLT), tracking-learning-detection (TLD), Scale-invarient feature transform (SIFT), Harris corner detection, or the like. KLT tracking will be briefly described herein, but it should be appreciated that other techniques may be used in place of KLT tracking, or along with KLT tracking, or enable tracking and recognition of moving objects in the input video sequence (block 52). KLT tracking is utilized to provide the trajectories of a bundle of points. As will be appreciated by one skilled in the art, certain features of KLT tracking have been omitted for clarity and conciseness in the present invention.

FIG. 4 illustrates a schematic diagram of an embodiment of KLT tracking on the digital image 34. In the illustrated embodiment, the digital image 34 is divided into grids and includes representative points 80. For example, the points 80 may be positioned at every 10 pixels. However, it should be appreciated that the points 80 may be arranged at different locations. For example, the points 80 may be arranged at each pixel, every 2 pixels, every 5 pixels, every 20 pixels, every 100 pixels, or any other reasonable number. Moreover, the position of the points 80 may be determined based on the resolution of the digital image 34. For example, in certain embodiments, cameras 22 utilized with PEDs 10 may acquire digital video at a rate of between 30 frames per second and 120 frames per second. Moreover, resolution may be 480i, 720i, 1080i, 2160i, 4320i, or the like. That is, resolution may range from so-called standard definition to so-called ultra-high-definition. Accordingly, the position of the points 80 may be determined as a percentage or ratio of the resolution and/or frame rate. For example, the points 80 may be 10 percent of the resolution, 20 percent of the resolution, 30 percent of the resolution, 40 percent of the resolution, 50 percent of the resolution, 60 percent of the resolution, 70 percent of the resolution, 80 percent of the resolution, 90 percent of the resolution, or any suitable percentage of the resolution. Moreover, the position of the points 80 may fall within ranges of the resolution, such as 10-30 percent of the resolution, 30-50 percent of the resolution, 50-70 percent of the resolution, 70-90 percent of the resolution, or any other suitable range.

As shown in FIG. 4, an embodiment of the digital image 34 includes a salient object 82. As illustrated, the points 80 are arranged over the digital image 34. It should be appreciated that the location and/or size of the points 80 are provided for illustrative purposes only and do not necessarily correlated to the location of the points 80 on the digital image 34 during processing. Moreover, in certain embodiments, the points 80 may be required periodically, for example, when the salient object 82 is tracked over long periods of time. FIG. 4(a) illustrates a first frame to begin tracking. In the illustrated embodiment, the salient object 82 is a parachute flying across a sky 84 including clouds 86 and different areas of illumination. That is, as the digital video progresses, the relative color of the salient object 82 may change as the salient object 82 crosses areas with different quantities of illumination. FIG. 4(b) illustrates the points 80 on a third frame of the digital video. It should be appreciated that the sampling rate may vary, based on the input. That is, while the illustrated embodiment includes the third frame, in other embodiments, the points may be tracked frame-by-frame or any other reasonable sampling rate. Moreover, the sampling rate may be a percentage of the frame rate of the digital video. For example, the sampling rate may be 10 percent of the frame rate, 20 percent of the frame rate, 30 percent of the frame rate, 40 percent of the frame rate, 50 percent of the frame rate, 60 percent of the frame rate, 70 percent of the frame rate, 80 percent of the frame rate, 90 percent of the frame rate, or any suitable percentage of the frame rate. Moreover, the sampling rate may fall within ranges of the frame rate, such as 10-30 percent of the frame rate, 30-50 percent of the frame rate, 50-70 percent of the frame rate, 70-90 percent of the frame rate, or any other suitable range.

As illustrated in FIG. 4(b), the salient object 82 has moved in position relative to FIG. 4(a). That is, the salient object 82 is arranged over different points 80 in FIG. 4(b) than in FIG. 4(a). Additionally, as shown in FIG. 4(c), the salient object 82 continues to move across different points 80. In this manner, the salient object 82 may be tracked utilizing the KLT tracking method.

Returning to FIG. 3, in the illustrated embodiment, the first track 54 continues with motion clustering (block 60). It should be appreciated that while the illustrated embodiment includes point tracking (block 58) before motion clustering (block 60), in other embodiments motion clustering (block 60) may be performed first. Motion clustering is a method to track salient objects in a digital image. In certain embodiments, motion clustering may be utilized with a digital video sequence that includes a collection of high-dimensional space and low-dimensional space. For example, in the illustrated embodiment, motion clustering may be performed utilizing sparse subspace clustering (SCC). However, it should be appreciated that in certain embodiments different techniques may be utilized along with SCC or in place of SCC. In SCC, tracking points that lie in a union of low-dimensional subspaces are clustered. Therefore, among infinitely many possible representations of a data in terms of other points, a sparse representation corresponds to selecting a few points from the same subspace. This motivates solving a sparse optimization program whose solution is used in a spectral clustering framework to infer the clustering of data into subspaces. Since solving the sparse optimization program is in general NP-hard, a convex relaxation is considered, and under appropriate conditions on the arrangement of subspaces and the distribution of data, the minimization program recovers the desired sparse representations. The algorithm can be solved efficiently and can handle data points near the intersections of subspaces. Moreover, SCC effectively handles data nuisances, such as noise, sparse outlying entries, and missing entries, directly by incorporating the model of the data into the sparse optimization program. SSC is "self-expressive," meaning that each data point in a union of subspaces can be efficiently represented as a linear or affine combination of other points in the dataset.

Figure 5A:
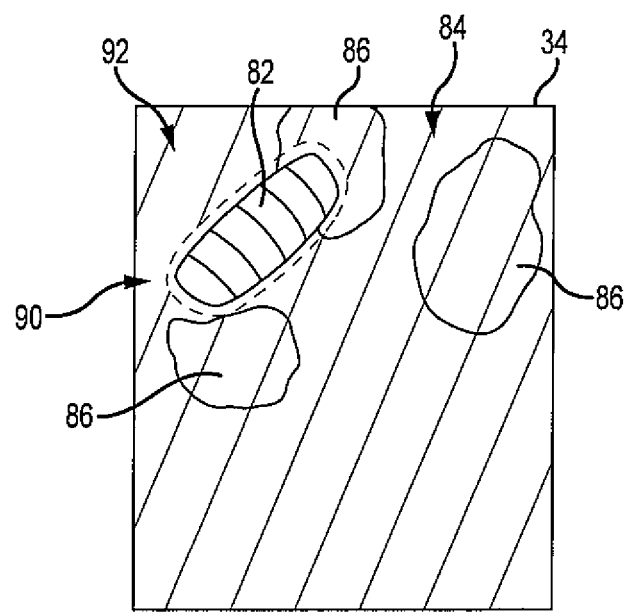
FIGS. 5A and 5B are schematic diagrams of an embodiment of a motion clustering algorithm, in accordance with embodiments of the present disclosure.
Figure 5B:
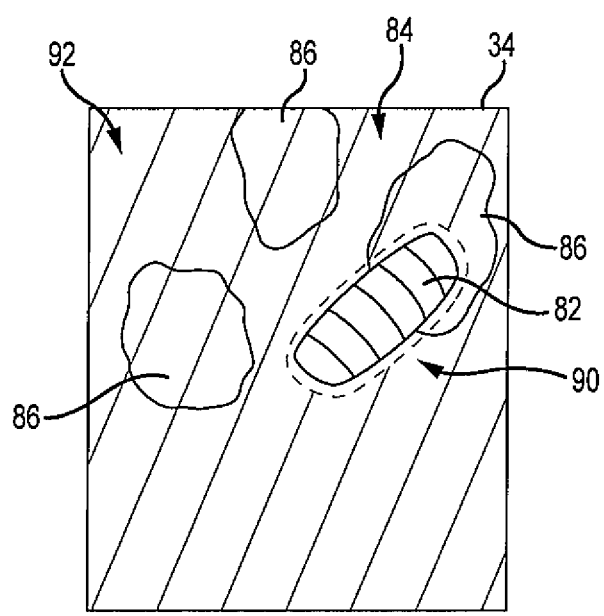

FIG. 5 illustrates a schematic diagram of the SCC algorithm clustering the trajectories acquired by the KLT point tracker from block 58. As described above, the SCC algorithm groups points that are moving together. For example, the SCC algorithm may evaluate the points 80 and determine whether they are moving at the same speed. If they are, it is likely that the points 80 are part of the same object, and the SCC algorithm groups them together. Moreover, other points 80 that may be moving at a different speed may be grouped together, for example, the background. In the illustrated embodiment, FIG. 5(a) illustrates clustering of the points 80. It should be appreciated that the points 80 illustrated in FIG. 4 have been removed for clarity. In the illustrated embodiment, the salient object 82 is positioned within a foreground cluster 90. Moreover, the hatch marks are utilized to represent a background cluster 92. As shown in FIG. 5(b), as the salient object 82 moves within the foreground cluster 90, different portions of the digital image 34 are recognized and clustered in the background cluster 92. In this manner, the foreground clusters 90 are differentiated from the background clusters 92 and the salient object 82 may be identified.

Turning back to FIG. 3, the second track 56 may be performed in parallel with the first track 54. That is, the video input in block 52 may be evaluated along both the first and second tracks 54, 56 at substantially the same time. As illustrated by the method 50, the second track 56 includes performing supervoxel clustering (block 62). In certain embodiments, supervoxel clustering may be performed utilizing simple linear interactive clustering (SLIC) due to the benefits of accuracy, speed, and memory efficiency. Furthermore, the approach may be extended into 3D space to perform clustering of video. However, it should be appreciated that, in certain embodiments, other techniques may also be utilized in addition to SLIC or in place of SLIC.

When using SLIC, or in the illustrated embodiment 3D SLIC, the digital video may be cut into clips, with each clip containing a fixed number of frames, which may be determined and adjusted based on the computing ability of the processor 12. Thereafter, each clip may be individually processed. Due to the quantity of detail in the digital images produced by high-definition or near-high-definition video, a bilateral filter may be applied to each frame of each clip. An intensity value of each pixel is replaced by a weighted average intensity value from neighboring pixels so that the edges around the objects are preserved and the other regions are smoothed. Also, bilateral filtering reduces the noise in each channel.

For example, if it is assumed that the supervoxels are initially square in each frame and approximately equal sized, a desired number of supervoxels on each frame is n and the thickness of each supervoxel is D along the temporal axis. Thereafter, the cluster centers may be initialized by sampling the clip on a regular grid spaced S pixel apart inside each frame and t pixel between frames (along the temporal axis). Therefore, the actual total number of supervoxels is determined by $$k = k_x \times k_y \times k_z \tag{1},$$

where $k_x$, $k_y$ and $k_z$ are the number of supervoxels along x, y and z (temporal) direction. Moreover, $k_x$, $k_y$ and $k_z$ may be represented by $$k_x = \frac{\text{total number of rows}}{S}, \quad (2)$$

$$k_y = \frac{\text{total number of columns}}{S}, \quad (3)$$

$$k_z = \frac{\text{total number of frames in each clip}}{D}. \quad (4)$$

In the illustrated embodiment, the accuracy for small color differences may be ignored and the video sequence is converted into CIELAB space. Each cluster is then represented by the vector $$C = [xyzL^*a^*b^*uv] \quad (5),$$

where x and y represent the special location and z carries the temporal information, $L^*$, $a^*$ and $b^*$ represent the spectral information and u, v are motion information extracted by optical flow.

Figure 6:
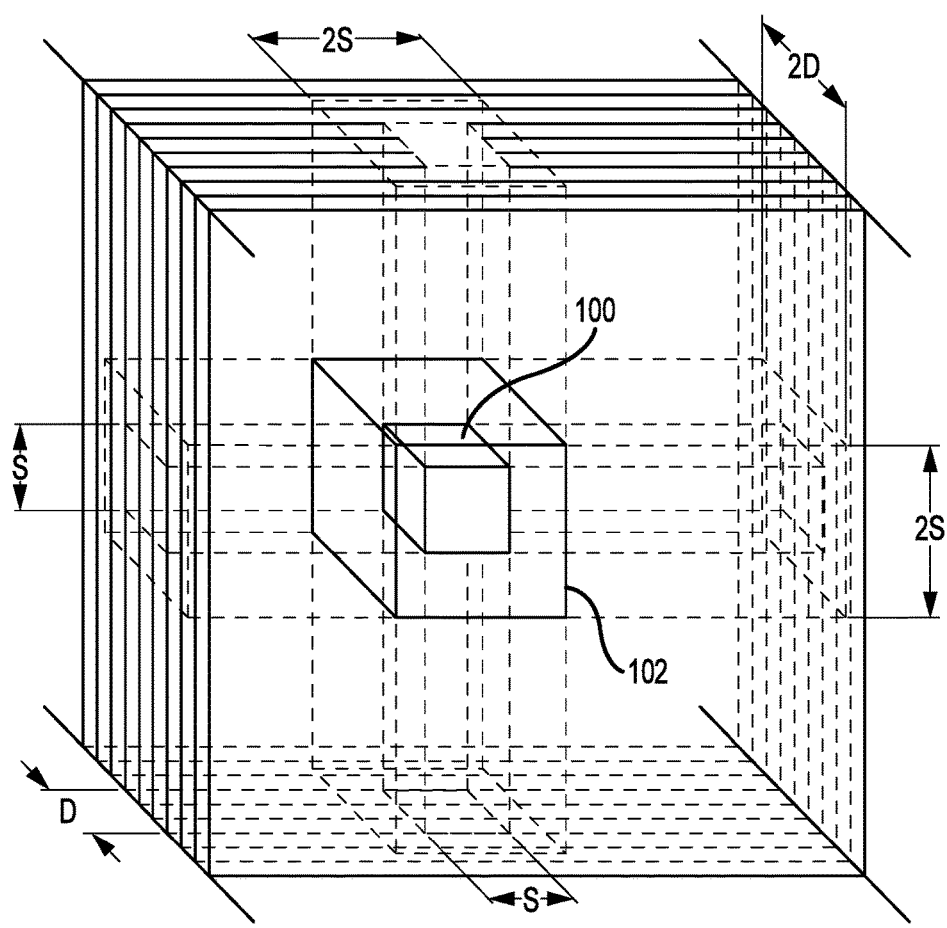
FIG. 6 is a schematic diagram of an embodiment of an initialization and search region of a supervoxel, in accordance with embodiments of the present disclosure.

Thereafter, in an assignment step, the cluster of each pixel is determined by calculating the distance between the pixel itself and the cluster center in the search region with size 2S×2S×2D, as shown in FIG. 6. In the embodiment illustrated in FIG. 6, an initialized supervoxel 100 of width S is positioned within a search region 102 of width 2S. Moreover, as shown in FIG. 6, the initialized supervoxel 100 is positioned along D consecutive frames. In the illustrated embodiment, each pixel will be calculated eight times since the initialized supervoxel 100 is enclosed by eight cluster search region 102.

Continuing with the 3D SLIC algorithm, in the illustrated embodiment, the distances in each domain are calculated separately and then combined after multiplying the appropriate weights. That is, the distance d is defined by the pixel location, the CIELAB color space, and motion vector in the image as follows:

$$d = \sqrt{\frac{d_l^2}{2S^2 + D^2} + \frac{d_c^2}{m} + \frac{w_m \cdot d_m^2}{RS}}, \quad (6)$$

where m is the regularity that controls the compactness of the supervoxel, $W_m$ is a weight on motion information, R is frame rate, and $$d_l = \sqrt{\Delta x^2 + \Delta y^2 + w_z \cdot \Delta z^2} \quad (7)$$

$$d_c = \sqrt{w_{L^*} \cdot \Delta L^{*2} + \Delta a^{*2} + \Delta b^{*2}} \quad (8)$$

$$d_m = \sqrt{\Delta u^2 + \Delta v^2} = \sqrt{\Delta \dot{x}^2 + \Delta \dot{y}^2} \quad (9)$$

where $w_z$ and $W_{L^*}$ are the weights for temporal distance and $L^*$ channel. In the distance measure, the location is normalized by the maximum distance in the 3D lattice $2S^2+D^2$ according to FIG. 6. The weight for the depth component $w_z$ is introduced since the inter-frame (lateral) position distance should be treated differently as in-frame (transverse) distance. Considering two adjacent supervoxels with depth D in temporal axis, these two supervoxels would shrink transversely and expand up to 2D in lateral direction during the iterations if the region surrounded is relatively uniform and the weight $w_z$ is small. This causes the increased number of clusters on a single frame.

As shown above, 3D SLIC does not explicitly enforce connectivity. For some clusters, the pixels are rent away by the adjacent supervoxels and only a small group of pixels (sometimes only one pixel) is retained in the cluster to keep the total number of clusters unchanged. Accordingly, the adjacency matrix may be generated and the clusters with number of pixels under a threshold are reassigned to the nearest neighbor cluster using connect component analysis. FIG. 7 is a schematic representation of 3D SLIC voxel grouping over three consecutive frames. As shown in FIGS. 7(a)-7(c), the boundaries 110 for the respective supervoxels 112 enclose areas having corresponding features. In the illustrated embodiment, the salient object 82 is enclosed by several supervoxels 112, corresponding to the different colors of the illustrated parachute. In this manner, by utilizing 3D SLIC, segmentation of the digital video image by be performed to thereby enable further processing for subsequent extraction and re-composition.

Returning to FIG. 3, after the first track 54 and the second track 56 are completed, the processed images are combined during coarse segmentation (block 64). As described above, by utilizing the first track 54 to perform object tracking and the second track 56 to perform segmentation, in parallel, improved results in a reduced period of time are achieved. That is, utilizing only the first track 54 or only the second track 56 will not yield the same results for later coarse segmentation (block 64). For example, the second track 56 is utilized to segment the image. Moreover, the first track 54 tracks movement of the salient object 82. By combing the two approaches before coarse segmentation (block 64), the resulting output utilizes fewer computing resources while also producing a desirable image for extraction and re-composition.

Figure 8C:
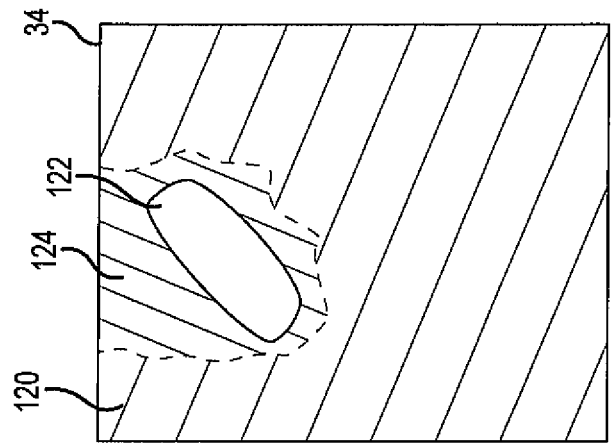
FIGS. 8A, 8B and 8C are schematic diagrams of an embodiment of a coarse segmentation algorithm, in accordance with embodiments of the present disclosure.
Figure 8B:
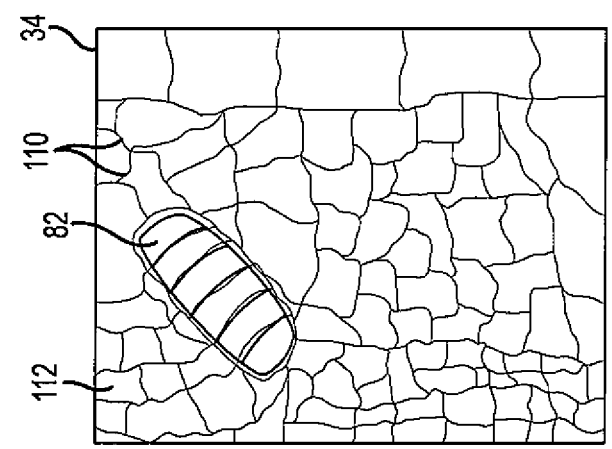
Figure 8A:
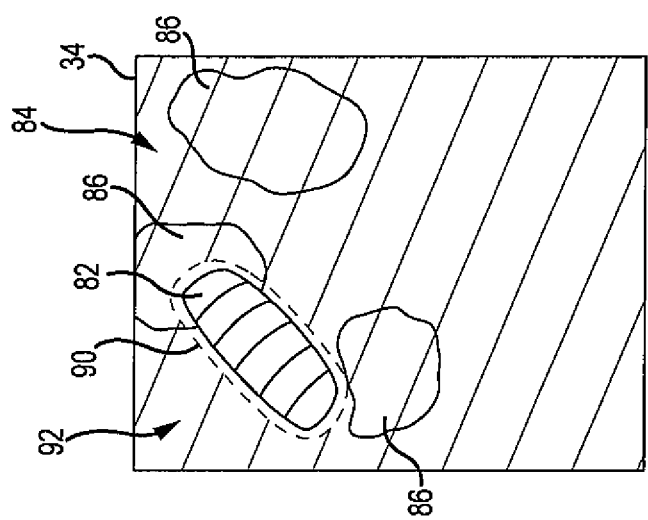

For each supervoxel 112, the coarse segmentation is performed by combining the SSC approach on the tracking points. That is, the results from the first track 54 and the second track 56 may be superimposed, with the algorithm evaluating the pixels within each supervoxel 112. FIG. 8 is a schematic representation of coarse segmentation of the digital image 34, such as a digital video. As shown in FIG. 8(a), the first track 54 provides an approximate region (e.g., the foreground cluster 90) containing the salient object 82. Moreover, the background cluster 92 is further defined by the hatching, thereby indicating which region includes the salient object 82. Furthermore, FIG. 8(b) illustrates the supervoxels 112 defined by their boundaries 110 around the salient object 82. As shown, the supervoxels 112 are arranged around the digital image 34. In the illustrated embodiment, the supervoxels 112 have various sizes, positions, and boundaries. The size of the supervoxels depends on the digital image 34 itself. For example, if there is a relatively uniform region in the digital image 34, then the supervoxel around this region would be large; however, if there are fine details in a region, then the corresponding supervoxel would be small. The salient object 82 can appear in either an uniform background or a complex background. As such, the coarse segmentation (block 64) may classify regions of the digital image 34, as illustrated in FIG. 8(c). For example, the background cluster 92 and the various supervoxels 112 in that region (e.g., in the specific locations corresponding to the background) may be classified as determined background 120. Furthermore, part of the foreground cluster 90 and contiguous supervoxels 112 (e.g., the specific supervoxels 112 in the locations corresponding to the foreground) may be classified as determined foreground 122. It should be appreciated that each individual supervoxel 112 is not marked for clarity in understanding the figures.

Additionally, the algorithm may further classify regions containing pieces of both background and foreground as an undetermined region 124. As such, large portions of the digital image 34 are classified and additional processing may focus on the determined foreground 112 and undetermined region 124.

It should be appreciated that processing may be done on a frame-by-frame basis or at any other sampling rate. For example, as sampling rate is increased, accuracy is also increased. However, increasing the sampling rate also increases processing consumption and time to perform the coarse segmentation (64). Accordingly, the sampling rate may be adjusted to account for diminishing returns. That is, evaluation may determine that the results from frame-by-frame sampling are approximately equivalent to the results from 10 frame-by-10 frame sampling. As such, the lower sampling rate may be utilized to conserve computing resources and improve processing times. Therefore, any reasonable sampling rate may be utilized. For example, the sampling rate may be 10 percent of the frame rate, 20 percent of the frame rate, 30 percent of the frame rate, 40 percent of the frame rate, 50 percent of the frame rate, 60 percent of the frame rate, 70 percent of the frame rate, 80 percent of the frame rate, 90 percent of the frame rate, or any suitable percentage of the frame rate. Moreover, the sampling rate may fall within ranges of the frame rate, such as 10-30 percent of the frame rate, 30-50 percent of the frame rate, 50-70 percent of the frame rate, 70-90 percent of the frame rate, or any other suitable range.

Next, in FIG. 3, the digital image 34 output from the coarse segmentation (block 64) undergoes fine segmentation (block 66). In certain embodiments, fine segmentation includes unsupervised, graph-based segmentation. That is, no user input is utilized. However, in other embodiments, user inputs may be utilized to assist in the determination of the salient object 82. In certain embodiments, algorithms such as GrabCut or Graph Cut may be used. GrabCut utilizes texture (color) and boundary (constraint) information to get reliable segmentation with a few user interactions. In certain embodiments, GrabCut may be utilized on the undetermined region 124. That is, the user may identify undetermined region 124, or the undetermined region 124 may be automatically determined, and then GrabCut may process that region. As a result, the area being evaluated is smaller than the entire digital image 34, thereby reducing processing resources and time.

Figure 9A:
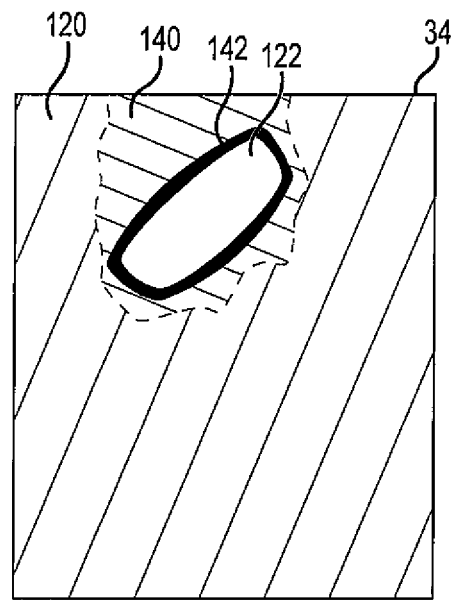
FIGS. 9A and 9B are schematic diagrams of an embodiment of a fine segmentation algorithm, in accordance with embodiments of the present disclosure.
Figure 9B:
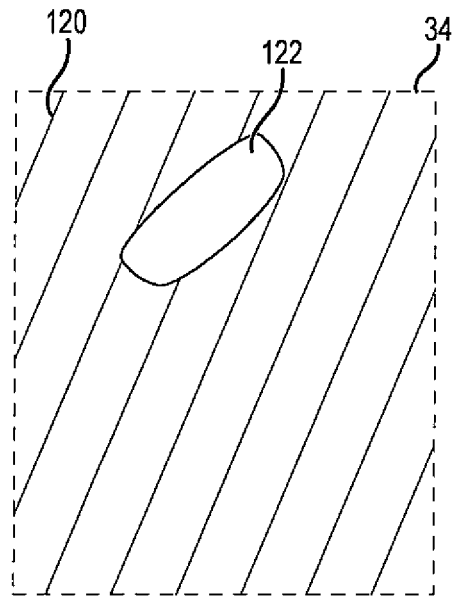

FIG. 9 is a schematic representation of the digital image 34 undergoing the fine segmentation process. In the embodiment illustrated in FIG. 9(a), the determined background 120 and the determined foreground 122 are arranged on the digital image 34. As described above, further processing is done on the undetermined region 124, which is broken up into a likely background region 140 and a likely foreground region 142, via the processing described above. Thereafter, as shown in FIG. 9(b), the likely background region 140 is merged with the determined background 120 and the likely foreground region 142 is merged with the determined foreground 122. Accordingly, the salient object 82 is defined in the determined foreground 122 and can be extracted and utilized for re-composition, as described below.

Figure 10B:
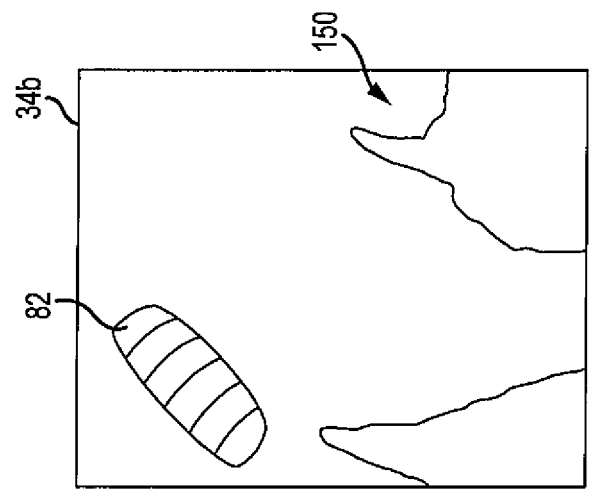
FIGS. 10A and 10B are schematic diagrams of an embodiment of a visual effect, in accordance with embodiments of the present disclosure.
Figure 10A:
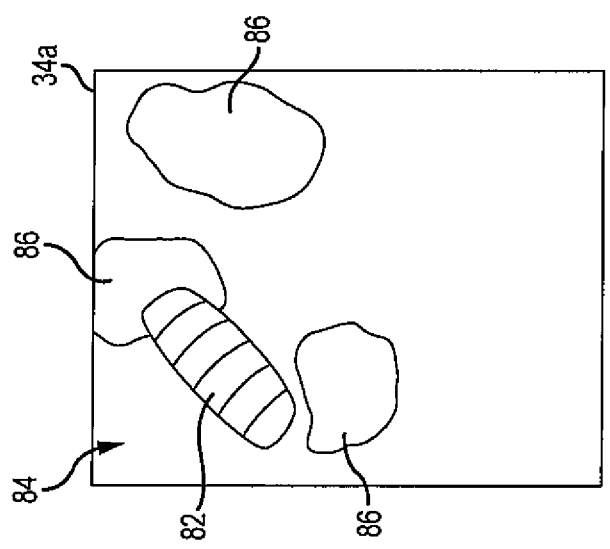

FIG. 10 is a schematic representation of re-composition of the salient object 82 on a second digital image 34b. In the illustrated embodiment, FIG. 10(a) illustrates the first digital image 34a includes the salient object 82, in this case a parachute in the sky 84 surrounded by clouds 86. By performing steps of the method 50, the salient object 82 may be extracted from the first digital image 34a. As described in detail above, the first digital image 34a may be a digital video and the salient object 82 may be tracked and extracted across multiple frames of the digital video, thereby enabling extraction of the salient object 82 throughout the digital video. After extraction, the user may wish to re-compose the salient object 82 onto the second digital image 34b, such as a second digital video. For example, in the illustrated embodiment, the second digital image 34b illustrated in FIG. 10(b) depicts a canyon and mountainous region. In embodiments, the user may wish to enable re-composition onto the second digital image 34b to create a more pleasing and/or dramatic effect. That is, the user may wish to position the salient object 82 onto a different image for a number of reasons, including creating the appearance of being in a different location or to create a certain type of special effect, such as an augmented or virtual reality effect. As illustrated in FIG. 10(a), the salient object 82 is identified and extracted, as described above. Thereafter, the salient object 82 is positioned at the same location onto the second digital image 34b. For example, in FIG. 10(b), the second digital image 34b includes a canyon 150, thereby forming a more dramatic and visually pleasing image because the second digital image 34b generates the appearance that the salient object 82 (e.g., the parachute) is gliding over the canyon 150. Accordingly, the effects may be created (block 68), as illustrated in FIG. 3, after extraction of the salient object 82.

Figures 11A, 11B, 11C:
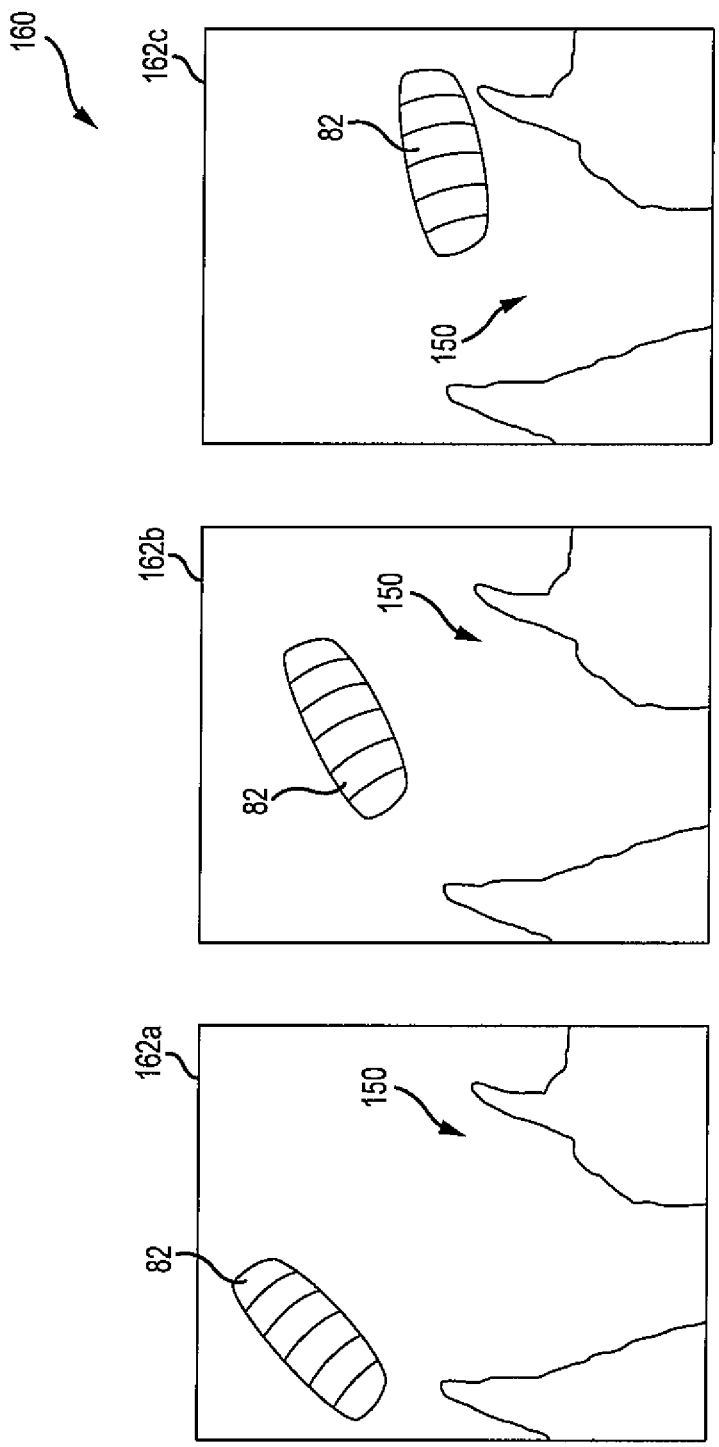
FIGS. 11A, 11B and 11C are schematic diagrams of an embodiment of a visual effect, in accordance with embodiments of the present disclosure.

FIG. 11 is a schematic representation of a video sequence 160 having the salient object 82 re-compositioned over a number of frames 162a, 162b, 162c. As described in detail above, the salient object 82 may be tracked and extracted from the digital image 34. Moreover, in certain embodiments, the digital image 34 is a digital video sequence. Accordingly, the salient object 82 may be tracked and extracted from several frames of the video sequence for later re-composition onto a number of frames of a second digital video sequence. In the illustrated embodiment, the frames 162a, 162b, and 162c represent digital images of the canyon 150. As illustrated, the salient object 82 gets lower, relative to a height of the frames 162a-c, indicating the salient object 82 (e.g., the parachute) is dropping down toward the ground. In the illustrated embodiment, the salient object 82 is shown as gliding downward toward the canyon 150, thereby creating a dramatic effective that may be considered visually pleasing to the user. In other words, the video sequence 160 may be desirable and/or a target video sequence based on user preferences. It should be appreciated that desirable images may be particularly selected by the user based on desired outcomes, such as simulations of events occurring at different locations or to superimpose fictitious images, such as animated characters, onto real life images for AR or VR applications. For example, in embodiments, the user may wish to extract an animated character from a video sequence and position that extracted animated character onto a different video sequence to simulate the animated character interacting with human beings. In this manner, as described above, salient objects (82) may be identified, tracked, extracted, and thereafter re-compositioned onto different digital images. In addition, the extracted objects can be scaled, rotated, or transformed through other means during the re-composition process. Some example transformations include changes in the color, contrast, brightness, tone, transparency of the extracted objects. Transformations can also include the application of special filters to the extract objects such as blurring, distorting, pixelating, or adding film grain.

Figure 12:
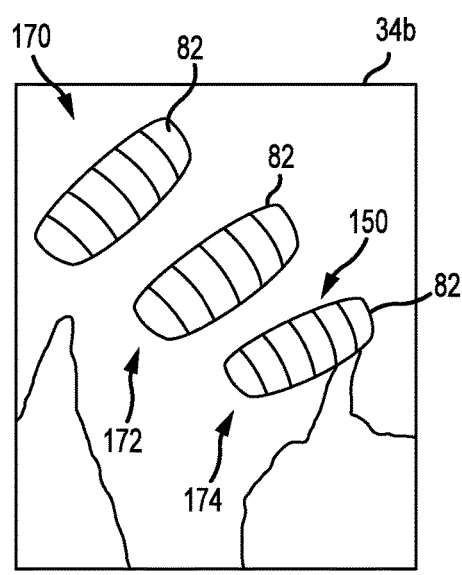
FIG. 12 is a schematic diagram of an embodiment of a visual effect, in accordance with embodiments of the present disclosure.

FIG. 12 is a schematic diagram of an embodiment of a special effect positioned on the second digital image 34b. As described in detail above, the salient object 82 may be extracted from the first digital image 34*a*. As a result, the position of the salient object 82 with respect to multiple frames form the first digital image 34*a* is known and acquired. Thereafter, as illustrated in FIG. 12, the salient object 82 may be re-compositioned onto the second digital image 34*b* at each location from the first digital image 34*a*. For instance, in embodiments where the second digital image 34*b* is a still photograph, multiple positions of the salient object 82 may be arranged across the second digital image 34*b*, thereby creating a blurred or moving effect. In the illustrated embodiment, the salient object 82 is shown in a first position 170, a second position 172, and a third position 174 all on the same second digital image 34*b*. Moreover, as described above, various effects such as shading, blurring, and changing the opacity of the salient object 82 may be applied to the second digital image 34*b* to create the desired effect. In this manner, for example, positions of the salient object 82 may be extracted from a dynamic image and positioned on a static image.

As described in detail above, embodiments of the present disclosure include the method 50 for identifying the salient object 82 (blocks 58, 60, 62) and thereafter extracting the salient object (blocks 64, 66) for later re-composition (block 68). For example, in embodiments, the first track 54 and the second track 56 may be utilized in parallel to perform tracking and segmentation of the salient object 82. Thereafter, results of the first and second track 54, 56 may be combined and processed utilizing coarse segmentation (block 64). Additional processing may be utilized to identify undetermined regions 124, such as via fine segmentation (66). Upon detection and extraction of the salient object 82, various effects may be generated (block 68) to create a pleasing digital image (e.g., dynamic image, static image) based on user preferences.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A computer-implemented method, comprising:
    receiving a digital image input, the digital image input containing one or more dynamic salient objects arranged over a background;
    performing a tracking operation, the tracking operation identifying the dynamic salient object over one or more frames of the digital image input as the dynamic salient object moves over the background;
    performing a clustering operation, in parallel with the tracking operation, on the digital image input, the clustering operation identifying boundary conditions of the dynamic salient object;
    combining a first output from the tracking operation and a second output from the clustering operation to generate a third output; and
    performing a segmentation operation on the third output, the segmentation operation extracting the dynamic salient object from the digital image input.

2. The computer-implemented method of claim 1, further comprising creating an effect using an extracted dynamic salient object from the digital image input.

3. The computer-implemented method of claim 1, wherein the tracking operation comprises a point tracking algorithm and a motion clustering algorithm, performed in series.

4. The computer-implemented method of claim 3, wherein the point tracking algorithm is performed before the motion clustering algorithm.

5. The computer-implemented method of claim 3, wherein the point tracking algorithm is a Kanade-Lucas-Tomasi point tracking algorithm and the motion clustering algorithm is a sparse subspace clustering algorithm.

6. The computer-implemented method of claim 1, wherein the clustering operation comprises supervoxel clustering.

7. The computer-implemented method of claim 1, further comprising re-compositioning an extracted dynamic salient object onto a digital image, the digital image being different than the digital image input.

8. The computer-implemented method of claim 1, wherein the segmentation operation comprises a graph-based segmentation, including a coarse segmentation and a fine segmentation, the coarse segmentation being performed before the fine segmentation.

9. A system, comprising:
    one or more processors; and
    memory including instructions that, when executed by the one or more processors, cause the system to:
        receive a digital image input, the digital image input containing one or more dynamic salient objects arranged over a background;
        perform a tracking operation, the tracking operation identifying the dynamic salient object over one or more frames of the digital image input as the dynamic salient object moves over the background;
        perform a clustering operation, in parallel with the tracking operation, on the digital image input, the clustering operation identifying boundary conditions of the dynamic salient object;
        combine a first output from the tracking operation and a second output from the clustering operation to generate a third output; and
        perform a segmentation operation on the third output, the segmentation operation extracting the dynamic salient object from the digital image input.

10. The system of claim 9, where the memory further includes instructions that, when executed by the one or more processors, cause the system to create an effect using an extracted dynamic salient object from the digital image input.

11. The system of claim 9, wherein the tracking operation comprises a point tracking algorithm and a motion clustering algorithm, performed in series.

12. The system of claim 9, wherein the clustering operation comprises supervoxel clustering.

13. The system of claim 9, wherein the segmentation operation comprises a graph-based segmentation including a coarse segmentation and a fine segmentation.

14. The system of claim 9, wherein the memory further includes instructions that, when executed by the one or more processors, cause the system to re-composition an extracted dynamic salient object onto a digital image, the digital image being different than the digital image input.

15. A non-transitory computer-readable storage medium storing instructions that, when executed by one or more processors, cause a computing system to:

receive a digital image input, the digital image input containing one or more dynamic salient objects arranged over a background;

perform a tracking operation, the tracking operation identifying the dynamic salient object over one or more frames of the digital image input as the dynamic salient object moves over the background;

perform a clustering operation, in parallel with the tracking operation, on the digital image input, the clustering operation identifying boundary conditions of the dynamic salient object;

combine a first output from the tracking operation and a second output from the clustering operation to generate a third output; and perform a segmentation operation on the third output, the segmentation operation extracting the dynamic salient object from the digital image input.

16. The non-transitory computer-readable storage medium of claim 15, further comprising instructions that, when executed by the one or more processors, cause the computing system to create an effect using an extracted dynamic salient object from the digital image input.

17. The non-transitory computer-readable storage medium of claim 15, wherein the tracking operation comprises a point tracking algorithm and a motion clustering algorithm, performed in series.

18. The non-transitory computer-readable storage medium of claim 15, wherein the clustering operation comprises supervoxel clustering.

19. The non-transitory computer-readable storage medium of claim 15, wherein the segmentation operation comprises a graph-based segmentation.

20. The non-transitory computer-readable storage medium of claim 15, further comprising instructions that, when executed by the one or more processors, cause the computing system to re-composition an extracted dynamic salient object onto a digital image, the digital image being different than the digital image input.

* * * * *